United States Patent
Abed et al.

(10) Patent No.: US 12,009,968 B1
(45) Date of Patent: Jun. 11, 2024

(54) MANAGING REGIONAL FAILOVER VIA DNS QUERIES

(71) Applicant: Amazon Technologies, Inc., Seattle, WA (US)

(72) Inventors: Samir Abed, Seattle, WA (US); Abhineet Bansal, Seattle, WA (US); Donavan Miller, Seattle, WA (US); Oren Nachman, Seattle, WA (US); Tsz Him Chiu, Sydney (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/643,813

(22) Filed: Dec. 10, 2021

(51) Int. Cl.
| | |
|---|---|
| *H04L 41/0686* | (2022.01) |
| *H04L 41/0668* | (2022.01) |
| *H04L 43/0805* | (2022.01) |
| *H04L 61/4511* | (2022.01) |
| *H04L 67/51* | (2022.01) |
| *H04L 67/60* | (2022.01) |

(52) U.S. Cl.
CPC ...... *H04L 41/0686* (2013.01); *H04L 41/0668* (2013.01); *H04L 43/0805* (2013.01); *H04L 61/4511* (2022.05); *H04L 67/51* (2022.05); *H04L 67/60* (2022.05)

(58) Field of Classification Search
None
See application file for complete search history.

(56) References Cited

U.S. PATENT DOCUMENTS

| | | | |
|---|---|---|---|
| 10,506,033 B2 * | 12/2019 | Cui | H04L 67/1036 |
| 2004/0172475 A1 * | 9/2004 | Tenereillo | H04L 69/163 709/225 |
| 2008/0086556 A1 * | 4/2008 | Ramalingam | H04L 69/40 709/224 |
| 2009/0055929 A1 * | 2/2009 | Lee | H04L 61/4511 707/E17.014 |
| 2010/0228853 A1 * | 9/2010 | Phanse | G06F 11/2023 709/224 |
| 2011/0141879 A1 * | 6/2011 | Ballard | H04L 41/0846 370/217 |
| 2012/0215915 A1 * | 8/2012 | Sakata | H04L 67/1001 709/224 |
| 2013/0159499 A1 * | 6/2013 | Besehanic | H04L 61/4511 709/224 |

(Continued)

*Primary Examiner* — Joshua Joo
(74) *Attorney, Agent, or Firm* — Knobbe Martens Olson & Bear LLP

(57) ABSTRACT

The present disclosure generally relates to a failover management service that can continuously monitor attributes of regional network resources to characterize resource availability per region. The failover management service associates the regional resource availability information with a set of hash values in which each individual hash value is representative a concatenation of a resource identifier and a client identifier associated with one or more individual clients. For individual hash values, the failover management service associates failover information, which is propagated to a DNS service. If a network-resource becomes unavailable, clients can transmit DNS queries including a hash value that discovers the appropriate failover information for the specific network-based resource and client device.

22 Claims, 7 Drawing Sheets

(56) References Cited

U.S. PATENT DOCUMENTS

| | | | |
|---|---|---|---|
| 2013/0318143 A1* | 11/2013 | Li | H04L 61/4511 |
| | | | 709/201 |
| 2014/0082172 A1* | 3/2014 | Chueh | H04L 41/50 |
| | | | 709/223 |
| 2014/0237121 A1* | 8/2014 | Phanse | H04L 69/40 |
| | | | 709/226 |
| 2016/0219015 A1* | 7/2016 | Ruggeri | H04L 9/40 |
| 2018/0048681 A1* | 2/2018 | Chiang | H04L 65/1016 |
| 2019/0340265 A1* | 11/2019 | Raman | G06F 9/5061 |
| 2021/0006455 A1* | 1/2021 | Sauer | H04N 21/23116 |
| 2021/0281537 A1* | 9/2021 | Zhang | H04L 67/1001 |
| 2023/0057236 A1* | 2/2023 | Wang | H04L 67/141 |

\* cited by examiner

MANAGING REGIONAL FAILOVER VIA DNS QUERIES

BACKGROUND

Generally described, computing devices and communication networks can be utilized to exchange data and/or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device and the network-based computing device can be referred to as a service provider. Additionally, the client computing device can collect or generate information and provide the collected information to a network-based computing device for further processing or analysis.

In some embodiments, a network service provider can provide computing device resources, such as virtual machine instances, that are configurable to execute tasks based on network service provider customers. In some scenarios, it may be possible that one or more network-based resources may become unavailable or otherwise experience performance issues. In such scenarios, the network service provider may provide alternative network-based resources, generally referred to as a failover of the network-based resources.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
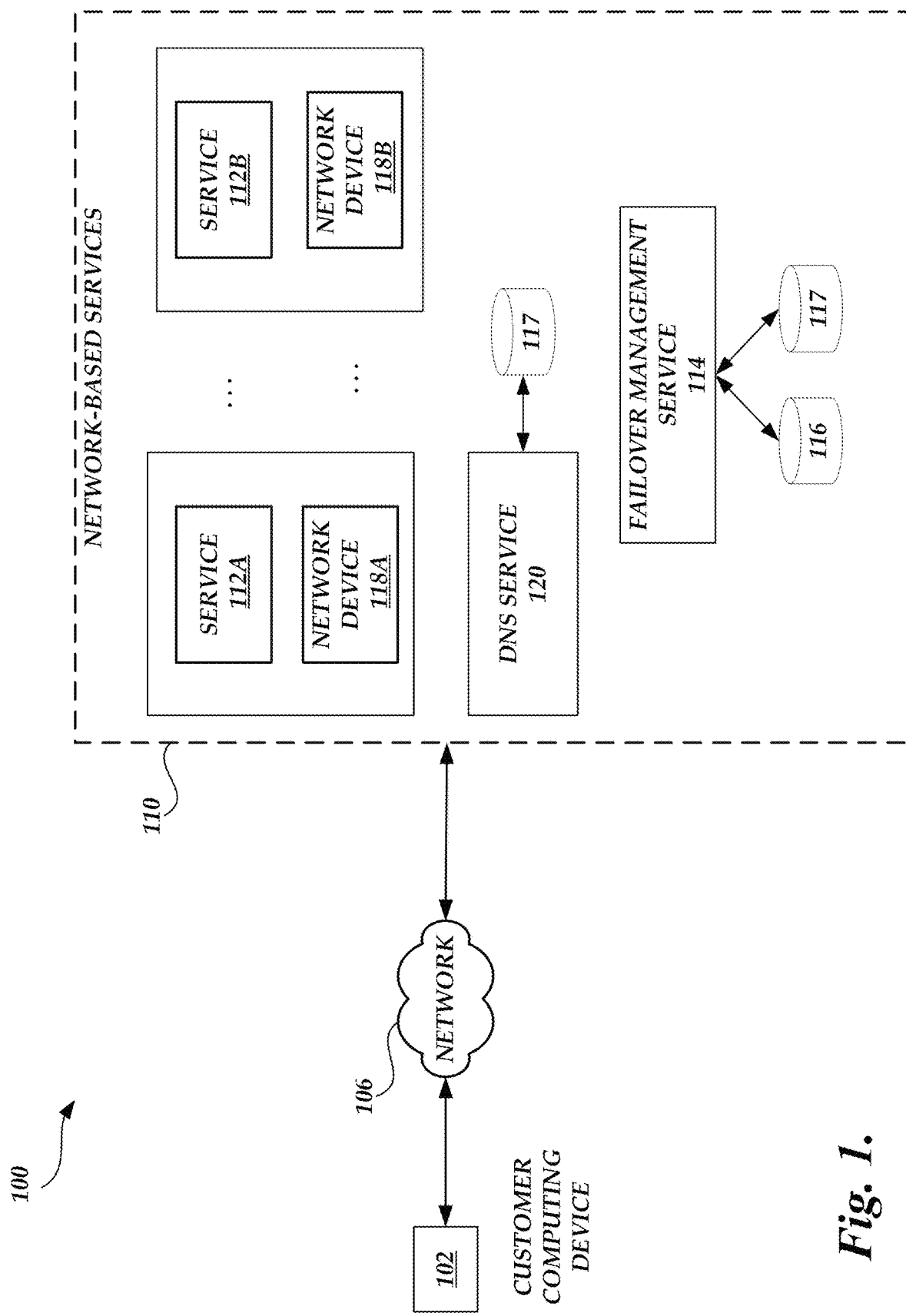
FIG. 1 is a block diagram depicting an illustrative system for implementing a network service for implementing a failover management service according to one or more aspects of the present application.

Aspects of the present disclosure relate to systems and methods a failover management service. More specifically, aspects of the present application can correspond to a failover management service that can continuously monitor attributes of regional network resources to characterize resource availability per region. The failover management service maintains the determined regional resource availability information according to a set of hash values. Each individual hash value is representative a concatenation of a resource identifier and a client identifier associated with individual clients. For individual hash values, the failover management service further associates individualized failover information, which is propagated to a DNS service. The availability information and failover information may be continuously monitored and periodically updated by the failover management service based on changes to network-resource availability, client identifiers, or the individualized failover information.

If a network-resource becomes unavailable, clients can transmit DNS queries including a hash value that discovers the appropriate failover information for the specific network-based resource and client device. The client device utilizes the same methodology to determine the hash value, namely, a hash representation of a concatenation of a resource identifier and client identifier. The responsive communication from a DNS service can include the identification of network resources corresponding to alternative regions that will function as failovers for the network resources experiencing (or characterized as experiencing) the failure. The receiving client device can then process the response to the DNS query to implement a failover based on the failover information. Illustratively, the utilization of the hash value of the concatenation of the resource identifier and client identifier, such as a salt value, can mitigate public disclosure of failover information or other configuration information associated with individual client devices.

In a multi-region network, network-based resources may become unavailable in a specific region while servicing clients. Traditionally, client devices can rely on an incident management service or other failover support service deployed within the same region to facilitate failover to network-based resources in a different region. However, a larger-scale regional failover would prevent access to such incident management services, impacting the failover process. More specifically, in some larger-scale regional failover scenarios, a client device configured to transmit requests for failover information may be limited to transmitting the request to the same region experiencing the failure. Accordingly, the incident management service may be experiencing the same failure attributes and may not be available. This can result in network-resource unavailability for the client devices or would require custom failover configuration on each individual clients, which can be further inefficient to manage.

To address at least a portion of the above-described deficiencies, one or more aspects of the present application correspond to a failover management service that can continuously monitor attributes of regional network resources to characterize resource availability per region. The failover management service associates the regional resource availability information with a set of hash values in which each individual hash value is representative a concatenation of a resource identifier and a client identifier associated with individual client devices. The client identifier may be common to two or individual clients or may be unique to individual client devices. For individual hash values, the failover management service associates failover information, which is propagated to a DNS service. If a network-resource becomes unavailable, clients can transmit DNS queries including a hash value that discovers the appropriate failover information for the specific network-based resource and client device. Accordingly, client devices can query and receive failover information independent of regional failure of network resources.

Although aspect of the present application will be described with regard to illustrative network components, interactions and routines, one skilled in the relevant art will appreciate that one or more aspects of the present application may be implemented in accordance with various environments, system architectures, computing device architectures and the like. Additionally, the examples are intended to be illustrative in nature and should not be construed as limiting.

FIG. 1 depicts a block diagram of an embodiment of the system 100. The system 100 can comprise a network, the network connecting a number of computing devices 102 and a network service 110 via a communication network 106. Illustratively, the various aspects associated with the network service 110 can be implemented as one or more components that are associated with one or more functions or services. The components may correspond to software modules implemented by one or more computing devices, which may be separate stand-alone computing devise. Accordingly, the components of the network service 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 in FIG. 1 can connect to the network and the network service 110. Solely for purposes of illustration, computing devices 102 that will access one or more services 112 maintained by the network service 110. The computing devices 102 can be configured to transmit a request to the network service 110 to illustratively access one or more network-based services using a communication protocol. The computing devices 102 are configured to have at least one processor. That processor can be in communication with memory for maintaining computer-executable instructions. The computing devices 102 may be physical or virtual. The computing devices may be mobile devices, personal computers, servers, or other types of devices. The computing devices 102 may have a display and input devices through which a user can interact with the user-interface component.

Illustratively, the network service 110 can include a plurality of network-based services that can provide functionality responsive to configurations/requests transmitted by the client computing devices 102, such as in the implementation of a set of microservices that are configured to provide underlying functionality to applications hosted by a service provider. As illustrated in FIG. 1, the network-based services include as set of network-based services 112A, 112B, etc. Illustratively, each network-based service can be configured with defined functionality based on configuration information or executable commands. Illustratively, the network-based services 112A, 112B represent different logical or geographic regions provided by the network service 110. As described herein, in some embodiments, in the event of a detected failure, unresponsive communication, drop in performance, or other characterizations of a "failure," client devices 102 will be directed to access network resources by accessing network-based resources 112 in another region.

Figure 2:
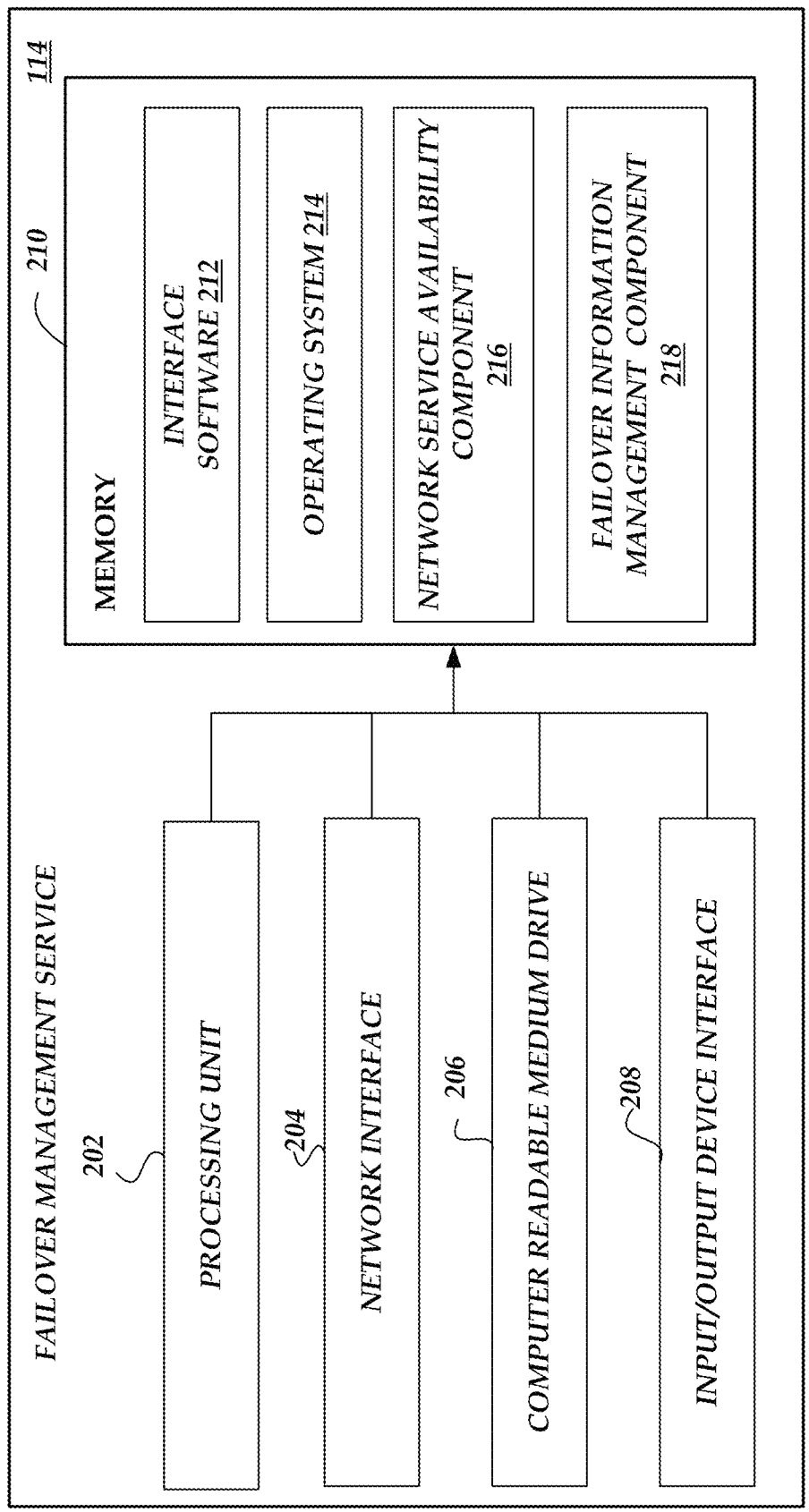
FIG. 2 is a block diagram illustrative of components of a failover management service in accordance with aspects of the present application.

The network service 110 further includes a failover management service 114 that represent the various functionality to monitoring the availability and network-based resources, such as one or more of the network-based services 112A, 112B. The failover management service 114 can further maintain and provide failover information for use in responsive DNS queries. The failover information can be based on processing various types of criteria, including financial criteria, service performance criteria, and the like. Illustrative components of the failover management service 114 are depicted in FIG. 2. The failover management service 114 can be further associated with a network availability data store 116 related to determined/reported availability of regional network resources and a salt data store 117 for unique identifiers (e.g., salt values) for a set of client devices. The salt values will be utilized to preserve or obfuscate client configuration information maintained in DNS services.

The network service 110 further includes one or more DNS routing services 120 that corresponds that correspond to network DNS request processing functionality utilized by the network service 110 to facilitate communications between the network services 112 (or other components) and external computing devices, such as client device 102. As will be described, one or more DNS service components 120 can be provided or updated with failover information sorted by hash values as described herein. The failover information may be maintained in a data store 122. Illustratively, the DNS service can correspond to stand-alone services or other services that may provide inputs to the failover management service 114 or other implement a portion of the functionality associated with or utilized by the failover management service 114. The additional services 120 may be hosted as part of network services 110 or may be an independent service hosted separately or a by a third party.

FIG. 2 depicts one embodiment of an architecture of an illustrative server for implementing the failover management service 114 as described. The general architecture of the failover management service 114 depicted in FIG. 2 includes an arrangement of computer hardware and software components that may be used to implement aspects of the present disclosure. As previously discussed, the components of the failover management service 114 may include physical hardware components, one or more virtualized components or a combination thereof. Additionally, the components of the failover management service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the failover management service 114.

As illustrated, the failover management service 114 includes a processing unit 202, a network interface 204, a computer readable medium drive 206, and an input/output device interface 208, all of which may communicate with one another by way of a communication bus. The components of the failover management service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208 In some embodiments, the failover management service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the failover management service 114. The memory 210 may further include computer program instructions and other information for implementing aspects of the present disclosure. For example, in one embodiment, the memory 210 includes a network service availability component 216 that is configured to monitor attributes of network resources and identify the availability of the regional, network-based services. The memory 210 further includes a failover management component 218 that is configured to identify and implement network-based resource failover information as described herein.

Figure 3A:
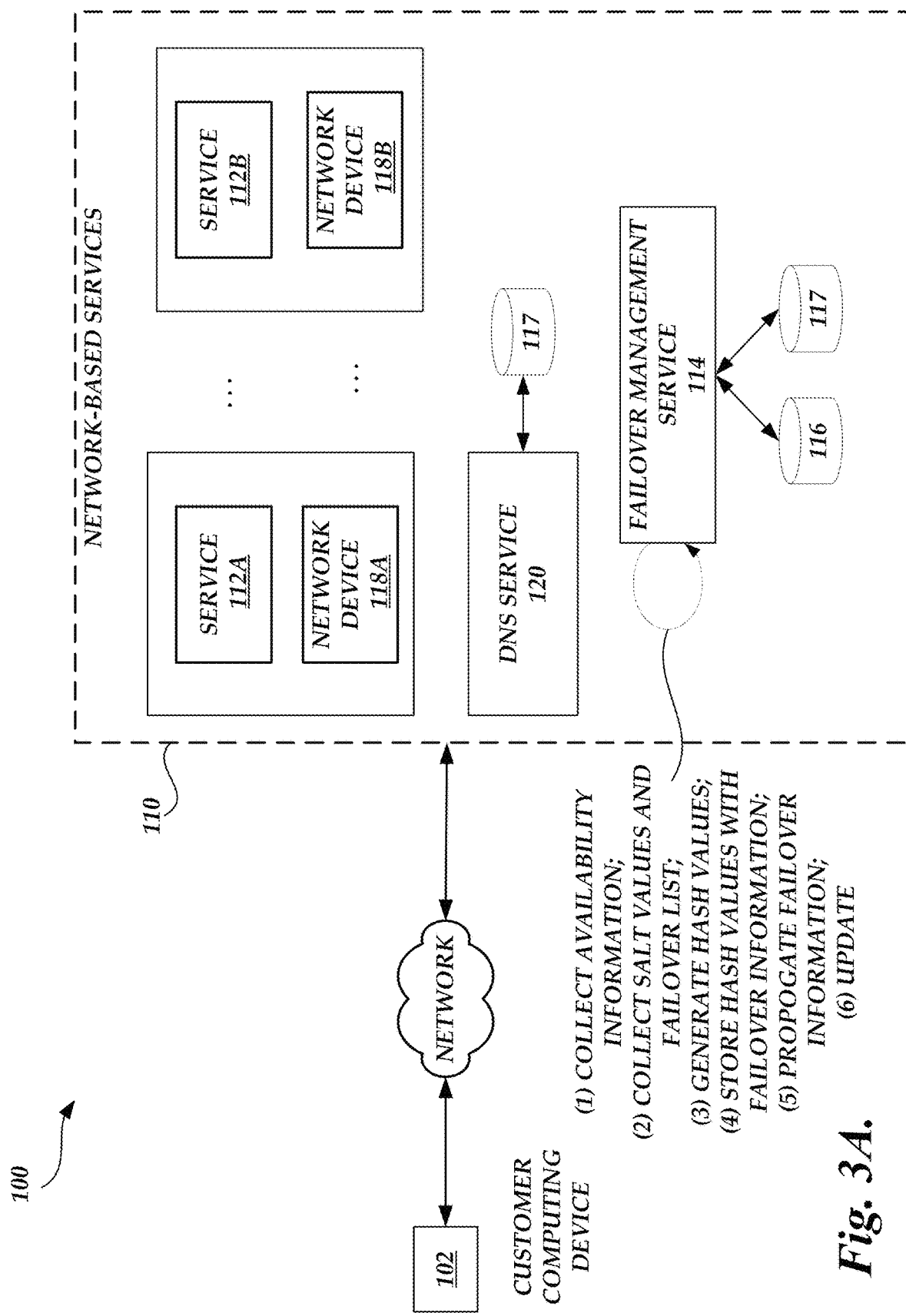
FIGS. 3A-3B are block diagrams of the system of FIG. 1 illustrating various interactions of the components related to generating and providing failover information using DNS queries in accordance with aspects of the present application.
Figure 3B:
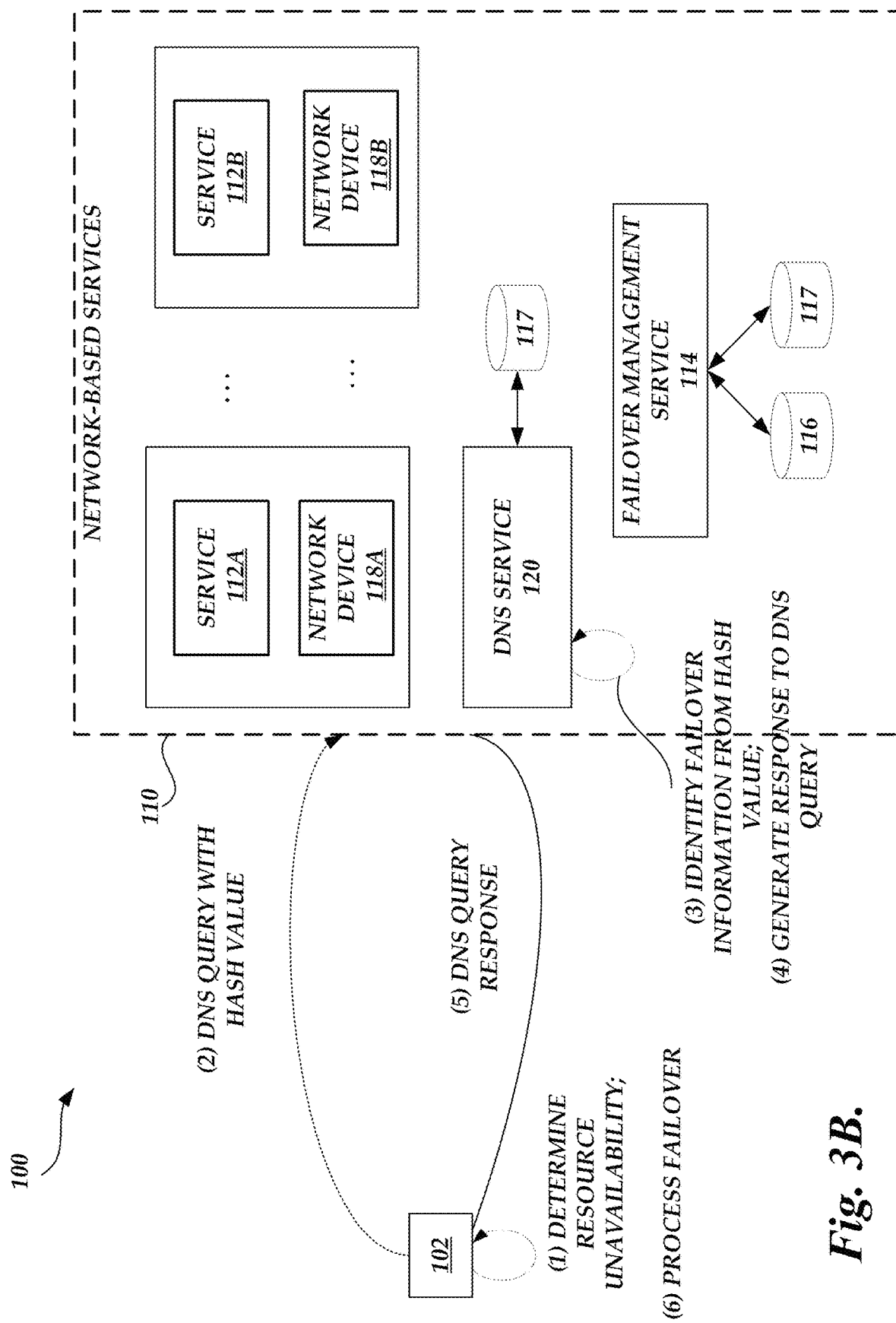

Turning now to FIGS. 3A-3B, illustrative interactions of the components of the system 100 will be described. For purposes of the illustration, it can be assumed that a network service 110 has been configured in a manner to implement a plurality of network services 112 on behalf of customers. Additionally, the network services 112 are associated with either regional or logical criteria such failure of network services in one region can be mitigate so as to not result in failures of network resources in other regions. Additionally, the network services 110 has illustratively been configured or instantiated with defined criteria for facilitating the selection, order or priority of failovers in the event of a detected or determined failures in any particular region.

With reference to FIG. 3A, an illustrative interaction prior to the implementation of network failover will be described. At (1), the failover management service 114 polls or receives availability information for a set of network services 112. The availability information can correspond to categories of information, such as not available, low availability, availability, high availability, max availability, etc. In other embodiments, the availability information can correspond to performance metrics or attributes that can be processed to assess availability or degrees of availability.

Illustratively, the failover management service 114 will store network resource availability based on unique identifiers for the network-based resource and client computing devices requesting the network-based resource. The failover management service 114 will then further associate failover information for a network-based resource, which can include unique failover information on a per client computing device or set of client computing devices. In one embodiment, the failover management service 114 can concatenate a network-based resource identifier unique to the network resource with a set of unique values corresponding to one or more client devices. The unique values are generally referred to as client identifiers or salt values. The client identifiers (generally) or salt values are configured to individual client devices in advance. For example, the failover management service 114 may transmit a client identifier to a client device as part of a registration or configuration process. Additionally, the failover management service 114 can replace or update the client identifiers, such as part of a periodic update or a detected compromise/corruption of a previously configured client identifier. The failover management service 114 can then generate a hash value of the concatenated network-based resource identifier unique to the network resource and salt value to form a table of hash values. Additionally, for each table entry, the failover management service 114 then maintains custom failover information, as described herein.

At (2), the failover management service 114 obtains the client identifiers or salt values and network-resource failover information. Illustratively, the network resource failover information corresponds to a prioritized list of network-based resources in alternative regions. The selection or prioritization can be based on various criteria, such as load balancing criteria, financial criteria associated with cost of accessing failover network-based resources, performance criteria, and the like. The failover information may be provided by a separate list that is configured to consider various inputs from the network service provider, clients, etc. and provide curated list(s) of failover information. Illustratively, if the client identifier corresponds to a large group of client devices, the failover information associated with the hash values of the concatenation would be representative of failover information for a larger set of client devices. Alternatively, the failover management service 114 can be implemented such that a plurality of client identifiers are utilized in which subsets of client devices or individual client devices may be configured according to unique client identifiers (relative to a generic client identifier). In such embodiments, the failover information may be curated in a manner that is unique to the subset of client devices or individual client device. At (3), the failover management service 114 generates the set of hash values. As described previously, the client device will either be configured with hash values calculated in the same manner or with processing functionality to be able to generate hash values in the same manner as the failover management service 114.

At (4), the failover management service 114 stores the hash values and prioritized list as failover information, such as data store 117 At (5), the failover management service 114 can then propagate the failover information to the DNS service 120 for used in responsive DNS queries. On skilled in the relevant art will appreciate that the distribution or propagation of the failover information may utilize any number of distribution methodologies.

At (6), the failover management service 114 can update the availability information and failover information, such as during periodic intervals or based on detected events. Illustratively, the failover management service 114 can update the maintained failover information based on a change in network-resource availability, such as the addition, modification or deletion of a network-based resource or the determined availability of such network-based resources. In another example, the failover management service 114 can update the maintained failover information based on a change to a client identifier. In this example, a client identifier may be corrupted or compromised in a manner that requires replacement. In this example, additional client identifiers may be generated and utilized on one or more client devices. In still another example, the failover management service 114 may receive updates to the curated list of the failover information, which may be dependent on other changes in availability, etc. The failover management service 114 may implement the updates based on occurrence of any of the above mentioned reasons/examples, a combination thereof, or additional alternative reasons.

With reference to FIG. 3B, after the DNS service 120 has been configured, assume at some time, at (1), the client device 102 determines or detects a failure. The detected failure may be based on failure to receive responses to communication, detected latencies or errors, notifications, etc. Illustratively, in the event of a detected or determined failure, the client device 102 will attempt to acquire failover information via a DNS query discover process. At (2), the client device transmits a DNS query to the DNS service 120. Illustratively, the DNS query will include a hash value associated with a concatenation of the resource identifier associated with the network-based resource and the client identifier or salt value unique to the individual client device 102. As described previously, the client device will either be configured with hash values calculated in the same manner or with processing functionality to be able to generate hash values in the same manner as the failover management service 114.

At (3), the DNS service 120 receiving the DNS query attempts to match the hash values included tin the DNS query by parsing and identifying the hash value. Based on a matching entry, the DNS service 120 can identify failover information at (4) and include a least a subset of the failover information in the response to the DNS query at (5).

Thereafter, the client device 102 can parse and process the failover information to mitigate the effect of the failure of the network resources in a region. Illustratively, the client device 102 may have additional logic that facilitates the selection of the failover information or prioritization of the failover information.

Figure 4:
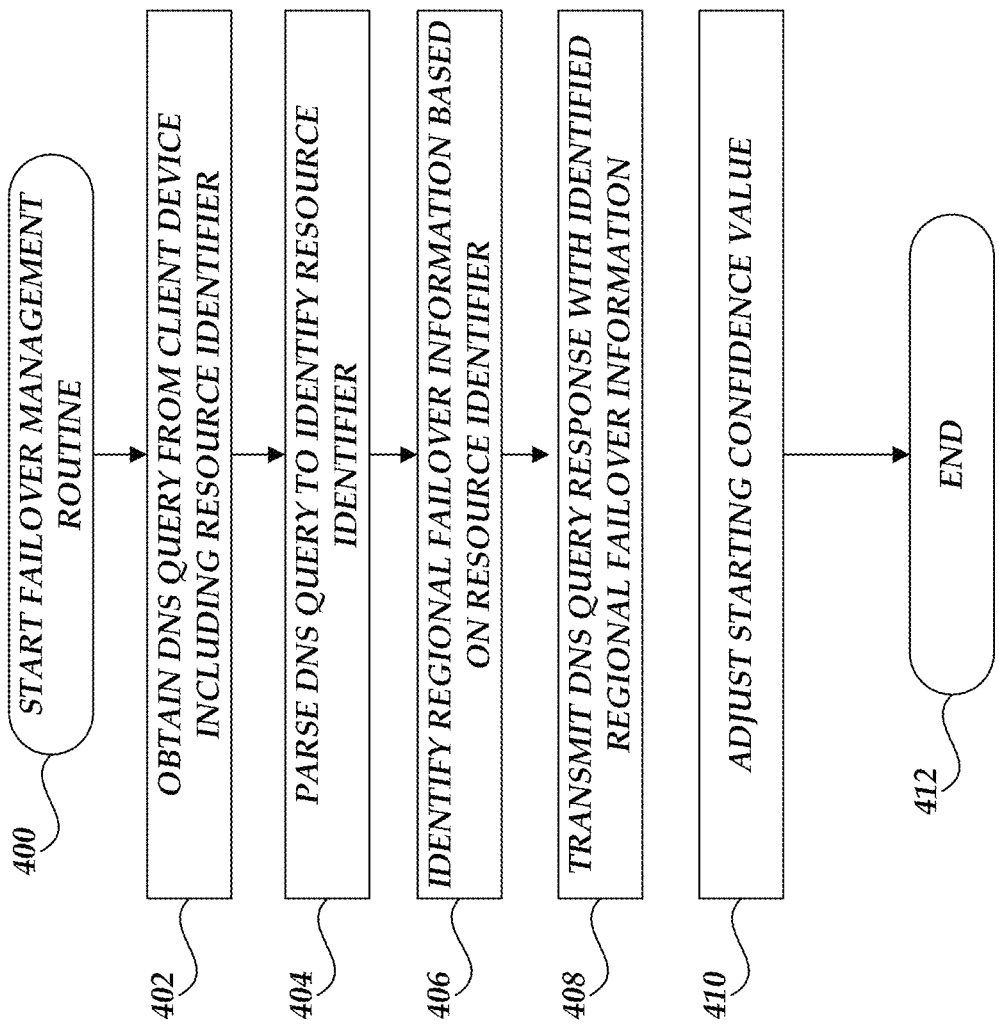
FIG. 4 is a flow diagram depicting an example routine for failover management via DNS queries in accordance with aspects of the present application.

Turning now to FIG. 4, a routine 400 for failover management utilizing failover information will be described. Routine 400 is illustratively implemented by the DNS service 120 or portion of the DNS service. As previously described, the client device transmits a DNS query to the DNS service 120 upon detection of a failure. Illustratively, the DNS query will include a hash value associated with a concatenation of the resource identifier associated with the network-based resource and the salt value unique to the individual client device 102. At block 402, the DNS service receives the DNS query.

At block 404, the DNS service 120 parses the DNS query to identify the hash value corresponding to the attempts to match the hash values included tin the DNS query by parsing and identifying the hash value corresponding to the concatenation of the resource identifier associated with the network-based resource and the salt value unique to the individual client device 102. Based on a matching entry, at block 406 the DNS query can identify failover information and include a least a subset of the failover information in the response to the DNS query.

At block 408, the DNS service 120 transmits a responsive communication to the DNS query. Thereafter, the client device 102 can parse and process the failover information to mitigate the effect of the failure of the network resources in a region. In some embodiments, the DNS service 120 can periodically updated with network resource availability or failover information. Routine 400 terminates at block 412.

Figure 5:
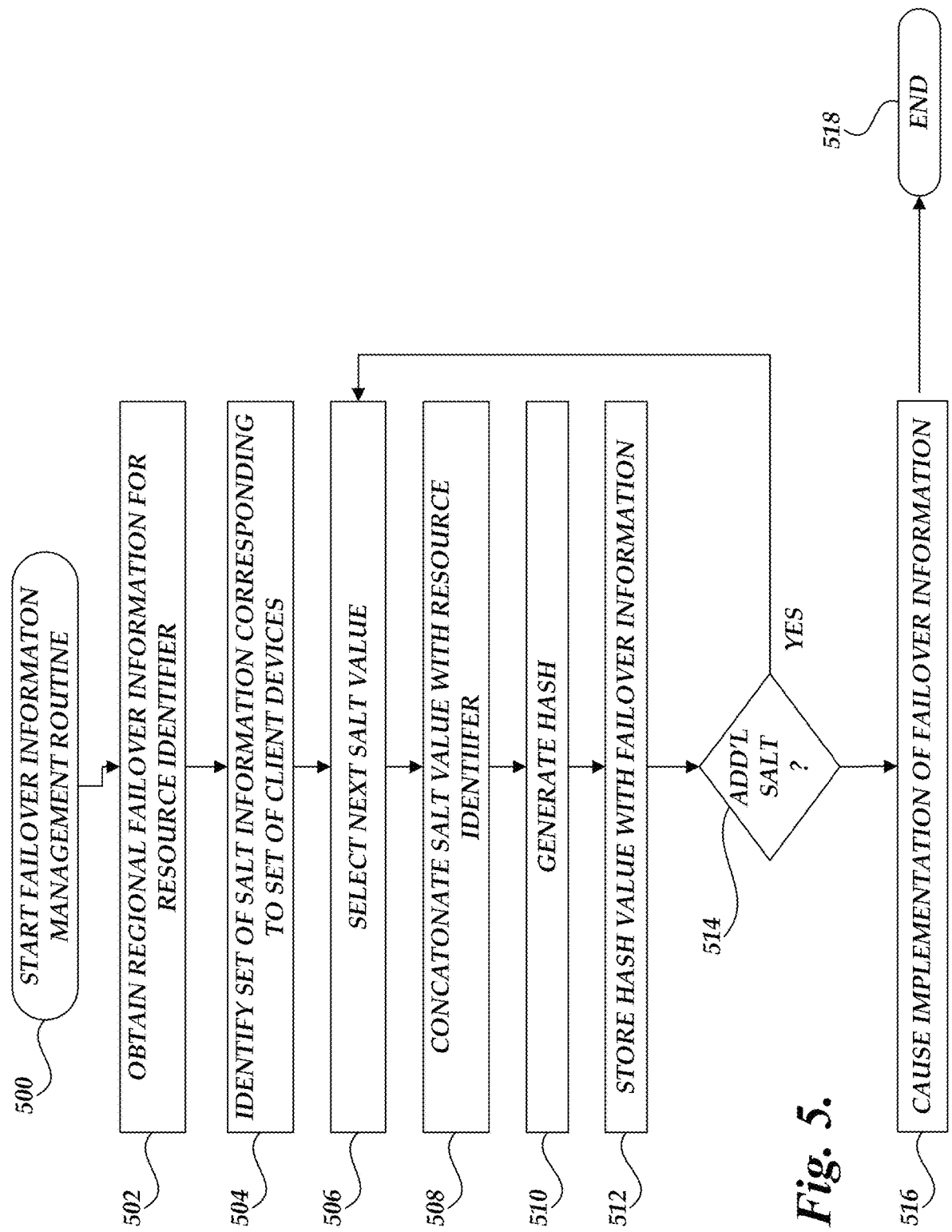
FIG. 5 is a flow diagram depicting an example routine for generating network-based resource failover information includes a plurality of identified network-based resources in one or more alternative regions.

FIG. 5 is a flow diagram illustrative of a routine for generating and maintain the failover information. As described above, the failover management service 114 will store network resource availability based on unique identifiers for the network-based resource and client computing devices requesting the network-based resource. The failover management service 114 will then further associate failover information for a network-based resource, which can include unique failover information on a per client computing device or set of client computing devices. In one embodiment, the failover management service 114 can concatenate a network-based resource identifier unique to the network resource with a set of unique values corresponding to one or more client devices. The unique values are generally referred to as salt values. The salt values are configured to individual clients in advance. The failover management service 114 can then generate a hash value of the concatenated network-based resource identifier unique to the network resource and salt value to form a table of hash values. Additionally, for each table entry, the failover management service 114 then maintains custom failover information.

At block 502, the failover management service 114 obtains regional failover information for a resource identifier. As described above, the regional failover information can be unique to individual client devices 120, sets of client devices 102, etc. In other embodiments, the failover information may not be unique. At block 504, the failover management service 114 identifies the set of salt values for individual client devices.

At block 506, the failover management service 114 enters into an iterative process by selecting the next salt value. At block 508, the failover management service 114 concatenates the salt value with the resource identifier. At block 510, the failover management service 114 generates the unique has. At block 512, the failover management service 114 stores the failover information with generated hash.

At decision block 514, a test is conducted to determine whether additional salt values exist. Illustratively, since each salt value corresponds to a client device 102, the generated hash corresponds to a unique entry per client without revealing the configuration of the client via the hash value. If so, the routine 500 returns to block 506. Alternatively, the routine proceeds to block 516 to cause implementation of the failover information to the DNS services 120. At block 518, the routine 500 terminates. As previously described, in some embodiments, the failover management services 114 may periodically update the failover information and may utilize some portion of routine 500 for updates. The failover management service 114 can update the availability information and failover information, such as during periodic intervals or based on detected events. Illustratively, the failover management service 114 can update the maintained failover information based on a change in network-resource availability, such as the addition, modification or deletion of a network-based resource or the determined availability of such network-based resources. In another example, the failover management service 114 can update the maintained failover information based on a change to a client identifier. In this example, a client identifier may be corrupted or compromised in a manner that requires replacement. In this example, additional client identifiers may be generated and utilized on one or more client devices. In still another example, the failover management service 114 may receive updates to the curated list of the failover information, which may be dependent on other changes in availability, etc. The failover management service 114 may implement the updates based on occurrence of any of the above mentioned reasons/examples, a combination thereof, or additional alternative reasons.

Figure 6:
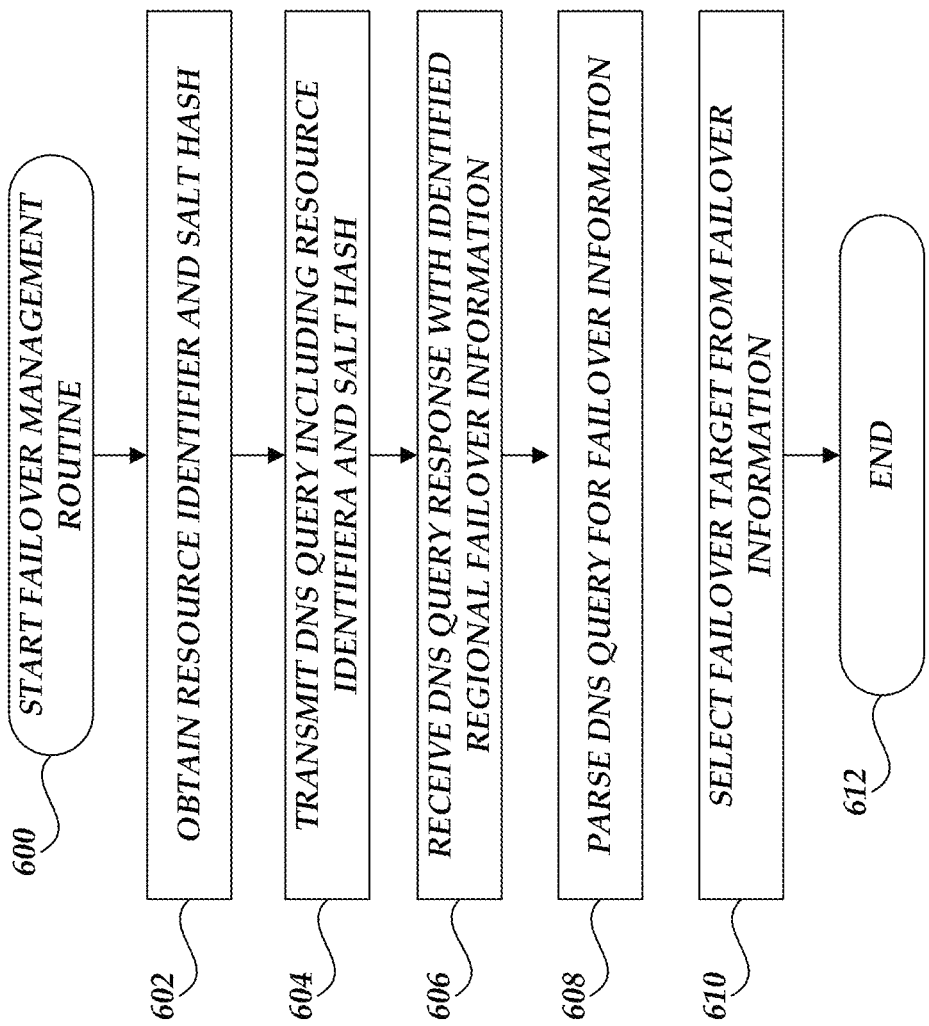
FIG. 6 is a flow diagram depicting an example routine for failover management via DNS queries in accordance with aspects of the present application

Turning now to FIG. 6, a routine 600 for failover management utilizing failover information will be described. Routine 600 is illustratively implemented by the client devices 102. Routine 600 is triggered with the determination of a failure. At block 602, the client device 102 determines a hash value associated with a concatenation of the resource identifier associated with the network-based resource and the salt value unique to the individual client device 102. the client device transmits a DNS query to the DNS service 120 upon detection of a failure. At block 604, the client device transit the DNS query.

Illustratively, the DNS service 120 receives parses the DNS query to identify the hash value corresponding to the attempts to match the hash values included tin the DNS query by parsing and identifying the hash value corresponding to the concatenation of the resource identifier associated with the network-based resource and the salt value unique to the individual client device 102. Based on a matching entry, at block 606, client device receives a response to the DNS query including the identified failover information At block 608, the client device 102 can parse and process the failover information to mitigate the effect of the failure of the network resources in a region. At block 610, the client device 102 selects a failover from the failover list. Routine 600 terminates at block 600.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing failover in multi-regional network-based services, the system comprising:
   one or more computing devices associated with a processor and a memory for executing computer-executable instructions to implement a failover management service, wherein the failover management service is configured to:
      obtain a DNS query from a client device, wherein the DNS query is transmitted responsive to a characterized failure of a network-based resource in a designated region, wherein the DNS query corresponds to network-based resource failover information query, the network-based resource failover information query include a hash value representative of a concatenation of an identifier associated with the network-based resource and a salt associated with the client device;
      parse the network-based resource failover information query to identify the hash value;
      obtain network-based resource failover information associated with the identified hash value, wherein the network-based resource failover information includes a plurality of identified network-based resources in one or more alternative regions; and
      transmit a DNS query response responsive to the obtained DNS query from the client device, the DNS query response including at least a subset of the plurality of identified network-based resources.

2. The system as recited in claim 1, wherein the salt corresponds to a unique identifier associated with the client device, the unique identifier previously configured on the client device.

3. The system as recited in claim 1, wherein the DNS query response includes the plurality of identified network-based resources in one or more alternative regions.

4. The system as recited in claim 1, wherein the failover management service is further operable to:
   obtain regional network-resource availability information; and
   determine the plurality of identified network-based resources in one or more alternative regions based on the obtained regional network-resource availability information to form the network-based resource failover information.

5. The system as recited in claim 4, wherein the failover management service is further operable to:
   for individual salt value of a set of salt values, concatenate the identifier associated with the network-based resource with the individual salt value, wherein the individual salt value of a set of salt values corresponds to one or more client devices;
   generate a hash value of the concatenation of the identifier associated with the network-based resource and the individual salt value; and
   associate the regional network-resource availability information, the plurality of identified network-based resources in one or more alternative regions based on regional-resource availability information and the generated hash value.

6. The system as recited in claim 4, wherein the failover management service identifies the one or more network-based resources in one or more alternative regions based on regional-resource availability information according to financial criteria.

7. The system as recited in claim 4, wherein the failover management service identifies the one or more network-based resources in one or more alternative regions based on regional-resource availability information according to service performance criteria.

8. A method for managing network-based services comprising:
   maintaining failover information for a set of network-based resources, wherein the failover information is associated with individual identifiers transmitted with DNS queries;
   obtaining individual DNS queries from one or more client devices, wherein the individual DNS queries are obtained responsive to a determined failover of an identified network-based resource in an identified region, wherein the individual DNS queries include an individual identifier corresponding to the identified network-based resource, and wherein the individual identifier includes a hash value, and wherein the hash value is a representative of a concatenation of an identifier associated with the identified network-based resource and a client identifier; and
   transmitting a DNS query response responsive to one or more of the obtained individual DNS queries from the one or more client devices, the DNS query response including failover information identifying at least one network-based resource in an alternative region as a failover for the identified network-based resource.

9. The method as recited in claim 8, wherein the identified network-based resource corresponds to the identified region, and wherein the client identifier is associated with a client device transmitting at least one of the individual DNS queries.

10. The method as recited in claim 8, wherein the client identifier corresponds to a unique identifier associated with a plurality of client devices, the unique identifier previously configured on the client device transmitting at least one of the individual DNS queries.

11. The method as recited in claim 8, wherein the client identifier corresponds to a unique identifier associated uniquely with an individual client device, the unique identifier previously configured on the client device transmitting at least one of the individual DNS queries.

12. The method as recited in claim 8, wherein the failover information identifying at least one network-based resource in an alternative region as a failover for the identified network-based resource includes a plurality of identified network-based resources in one or more alternative regions.

13. The method as recited in claim 8 further comprising:
   obtaining regional network-resource availability information; and
   identifying one or more network-based resources in one or more alternative regions based on regional-resource availability information to form the network-based resource failover information.

14. The method as recited in claim 13 further comprising:
   for individual salt value of a set of salt values, concatenating the resource identifier associated with the identified network-based resource with the individual salt value, wherein the individual salt value of a set of salt values corresponds uniquely to the one or more client devices transmitting the individual DNS queries;
   generating a hash value of the concatenation of the identifier associated with the network-based resource and the individual salt value; and
   associating the regional network-resource availability information, the identified one or more network-based resources in one or more alternative regions based on regional-resource availability information and the generated hash value.

15. The method as recited in claim 13, wherein identifying one or more network-based resources in one or more alternative regions based on regional-resource availability information includes identifying the one or more network-based resources in one or more alternative regions based on regional-resource availability information according to financial criteria.

16. The method as recited in claim 13, wherein identifying one or more network-based resources in one or more alternative regions based on regional-resource availability information includes identifying the one or more network-based resources in one or more alternative regions based on regional-resource availability information according to service performance criteria.

17. The method as recited in claim 8 further comprising updating the maintained failover information for a set of network-based resources based on at least one of a change in network-based resource availability, a change in the client identifier, or a change in the identified at least one network-based resource in the alternative region.

18. A method for managing access to network-based services comprising:
   transmitting, by a client device, individual DNS queries to a DNS service, wherein the individual DNS queries are obtained responsive to a determined failover of an identified network-based resource in an identified region, wherein the individual DNS queries include an individual identifier corresponding the identified network-based resource, and wherein the individual identifier includes a hash value, and wherein the hash value is a representative of a concatenation of an identifier associated with the identified network-based resource and a client identifier; and
   receiving, by the client device, a DNS query response responsive to one or more of the transmitted individual DNS queries, the DNS query response including failover information identifying at least one network-based resource in an alternative region as a failover for the identified network-based resource.

19. The method as recited in claim 18, wherein the identified network-based resource corresponds to the identified region, and wherein the client identifier is associated with a client device transmitting the DNS query.

20. The method as recited in claim 18, wherein the client identifier corresponds to a unique identifier associated with the client device, the unique identifier previously configured on the client device.

21. The method as recited in claim 18, wherein the failover information identifying at least one network-based resource in an alternative region as a failover for the identified network-based resource includes a plurality of identified network-based resources in one or more alternative regions.

22. The method as recited in claim 21, wherein the plurality of identified network-based resources in one or more alternative regions is prioritized according to service provider criteria.

* * * * *